US012626837B2

(12) United States Patent
Kim et al.

(10) Patent No.: US 12,626,837 B2
(45) Date of Patent: May 12, 2026

(54) METHOD FOR MANUFACTURING FUSING BUSBAR

(71) Applicant: A.F.W. CO., LTD., Chilgok-gun (KR)

(72) Inventors: Kiyoung Kim, Daegu (KR); Youngmin Leem, Daegu (KR)

( * ) Notice: Subject to any disclaimer, the term of this patent is extended or adjusted under 35 U.S.C. 154(b) by 580 days.

(21) Appl. No.: 17/985,816

(22) Filed: Nov. 11, 2022

(65) Prior Publication Data

US 2023/0238155 A1 Jul. 27, 2023

(30) Foreign Application Priority Data

Jan. 24, 2022 (KR) ........................ 10-2022-0009844

(51) Int. Cl.
*H01B 5/02* (2006.01)
*H01B 13/00* (2006.01)

(52) U.S. Cl.
CPC ........... *H01B 5/02* (2013.01); *H01B 13/0016* (2013.01)

(58) Field of Classification Search
CPC ...... H01B 5/02; H01B 13/0016; H01H 69/02; H01H 2069/027; H01R 4/625; Y10T 29/49107; B23K 20/04; B23K 2101/38; B23K 2103/10; B23K 2103/12; B23K 2103/18
See application file for complete search history.

(56) References Cited

U.S. PATENT DOCUMENTS

| | | | | |
|---|---|---|---|---|
| 3,148,257 | A | 9/1964 | Feenan et al. | |
| 2005/0230371 | A1* | 10/2005 | Kutsuna | B23K 26/037 219/121.64 |
| 2013/0048154 | A1* | 2/2013 | Prevond | C22F 1/04 148/531 |
| 2013/0076478 | A1* | 3/2013 | Christmann | H01H 85/06 337/293 |

(Continued)

FOREIGN PATENT DOCUMENTS

| | | | |
|---|---|---|---|
| DE | 477907 | C | 6/1929 |
| DE | 102005024321 | A1 | 11/2006 |

(Continued)

OTHER PUBLICATIONS

KR 20160129564 A translation from FIT database (Year: 2025).*

(Continued)

*Primary Examiner* — Thomas J Hong
*Assistant Examiner* — Joshua D Anderson
(74) *Attorney, Agent, or Firm* — ANTONIO HA & U.S. PATENT, LLC

(57) ABSTRACT

A method for manufacturing a fusing busbar comprises a first disposing step of disposing wound second conductors on upper and lower surfaces of two opposite ends of a wound first conductor formed of a different material from the second conductors, a first rolling step of unwinding the first conductor and the second conductors and continuously feeding the first conductor and the second conductors to a rolling mill to continuously press-weld the second conductors onto the upper and lower surfaces of the two opposite ends of the first conductor, with a predetermined gap (Continued)

between the second conductors, and a first forming step of inserting a joined plate of the first conductor and the second conductors into a forming machine to press-form the joined plate into a busbar shape in which the second conductors are disposed on two opposite sides of the joined plate, and the first conductor is exposed in a middle of the joined plate.

3 Claims, 9 Drawing Sheets

(56) References Cited

U.S. PATENT DOCUMENTS

| | | | | |
|---|---|---|---|---|
| 2015/0380908 | A1* | 12/2015 | Hwang | H01G 4/224<br>361/306.1 |
| 2020/0286827 | A1* | 9/2020 | Jiang | H01L 21/322 |

FOREIGN PATENT DOCUMENTS

| | | | | |
|---|---|---|---|---|
| JP | 04-188533 | | 7/1992 | |
| KR | 20140001290 | A * | 1/2014 | B32B 15/20 |
| KR | 10-2016-0129564 | | 11/2016 | |
| KR | 10-2019069 | | 9/2019 | |
| KR | 10-2034011 | | 10/2019 | |

OTHER PUBLICATIONS

KR-20140001290-A translation from FIT database (Year: 2025).*
English Specification of 10-2016-0129564.
English Specification of 10-2019069.
English Specification of 10-2034011.
English Specification of DE102005024321A1.
English Specification of DE477907C.
English Specification of JP04-188533.

* cited by examiner

METHOD FOR MANUFACTURING FUSING BUSBAR

CROSS-REFERENCE TO RELATED APPLICATION

This application claims priority to Korean Patent Application No. 10-2022-0009844 filed in the Korean Intellectual Property Office on Jan. 24, 2022, the disclosure of which is incorporated by reference herein in its entirety.

TECHNICAL FIELD

The disclosure relates to a method for manufacturing a fusing busbar, and more particularly, a method for manufacturing a fusing busbar by press-welding a first conductor and a second conductor, which are different materials, to reduce weight and manufacturing costs while providing a fusing function.

DISCUSSION OF RELATED ART

Electric components that use electricity perform their functions by receiving electricity from a battery or a power generator. If an overcurrent flows in the circuit to which electricity is supplied, the electric component may be damaged.

To prevent this, a fuse is used which is installed between the power supply and the electric component receiving electricity to melt and break upon supply of excessive electricity to thereby stop overcurrent from flowing to the electric component.

In other words, the fuse is a component commonly used in electronic and electrical engineering to protect a mechanical device from an overcurrent in an electric circuit.

Basically, a fuse is a thin metal wire that melts when an overcurrent flows and blocks the flow of current. Such fuses may be manufactured as busbars which are shaped as a long flat plate depending on their current blocking capacity. Recently, as electric vehicles spread, use of high-capacity batteries for electric vehicles significantly increases, and so does use of fusing busbars to increase electric stability for electric vehicles.

The conventional fusing busbar mainly used in electric vehicles uses copper as its main material, which has excellent electrical conductivity compared to the price, to increase the efficiency of electricity supply, and the fusing busbar is formed in a bar shape with a predetermined thickness to stably supply high electricity and has a thin melting portion in the center to break and block electricity when over electricity flows.

As such, the conventional fusing busbar uses copper which is expensive and heavy, causing an increase in manufacturing cost and an obstacle to making lightweight electric vehicles.

According to an embodiment, there is provided a method for manufacturing a fusing busbar by press-welding a first conductor and a second conductor, which are different materials, to reduce weight and manufacturing costs while providing a fusing function.

According to an embodiment, there is provided a method for manufacturing a fusing busbar in which the first conductor exposed by cutting the press-welded plate function as a melting portion performing a fusing function.

According to an embodiment, a method for manufacturing a fusing busbar comprises a first disposing step of disposing wound second conductors on upper and lower surfaces of two opposite ends of a wound first conductor formed of a different material from the second conductors, a first rolling step of unwinding the first conductor and the second conductors and continuously feeding the first conductor and the second conductors to a rolling mill to continuously press-weld the second conductors onto the upper and lower surfaces of the two opposite ends of the first conductor, with a predetermined gap between the second conductors, inserting a joined plate of the first conductor and the second conductors into a forming machine to press-form the joined plate into a busbar shape in which the second conductors are disposed on two opposite sides of the joined plate, and the first conductor is exposed in a middle of the joined plate.

The method may further comprise a first cutting step of cutting internal ends of the second conductors into a predetermined width along a length direction of the joined plate.

According to an embodiment, a method for manufacturing a fusing busbar comprises a second disposing step of disposing wound second conductors on upper and lower surfaces of a wound first conductor formed of a different material from the second conductors, a second rolling step of unwinding the first conductor and the second conductors and continuously feeding the first conductor and the second conductors to a rolling mill to press-weld the second conductors onto the upper and lower surfaces of the first conductor, a second cutting step of cutting the second conductors on the upper and lower surfaces of the first conductor to a predetermined width to partially expose the first conductor of a rolled joined plate of the first conductor and the second conductors, inserting the cut joined plate into a forming machine to press-form the joined plate into a busbar shape in which the second conductors are disposed on two opposite sides of the joined plate, and the first conductor is exposed in a middle of the joined plate.

The first conductor may be an aluminum plate, and the second conductors may be copper plates.

The method may further comprise a heating step of heating the first conductor and the second conductors at different temperatures for the first conductor and the second conductors, respectively, while unwinding the first conductor and the second conductors.

According to embodiments of the disclosure, the fusing busbar is manufactured by press-welding copper and aluminum materials, significantly saving manufacturing costs as compared with fusing busbars made only of copper and reducing weight to contribute to a reduction in the weight of electric vehicles.

Further, productivity may be enhanced by continuously manufacturing fusing busbars by press-welding copper and aluminum materials.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION

Embodiments of the disclosure are now described with reference to the accompanying drawings in such a detailed manner as to be easily practiced by one of ordinary skill in the art.

However, the embodiments set forth herein are provided merely for a better understanding of the structure and functions, and the scope of the disclosure should not be limited thereby or thereto.

Thus, various changes or modifications may be made to the embodiments and various equivalents thereof may be included in the scope of the disclosure.

It should be noted that a specific embodiment of the disclosure need not include all of the objectives or effects set forth herein and the scope of the disclosure should not be limited thereto or thereby.

Unless otherwise defined in connection with embodiments of the disclosure, all terms including technical and scientific terms used herein have the same meaning as commonly understood by one of ordinary skill in the art to which the embodiments of the disclosure belong.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Further, terms, such as "first" and "second" are used to simply distinguish between different components and do not limit the order of the components and scope of the disclosure.

Figure 1:
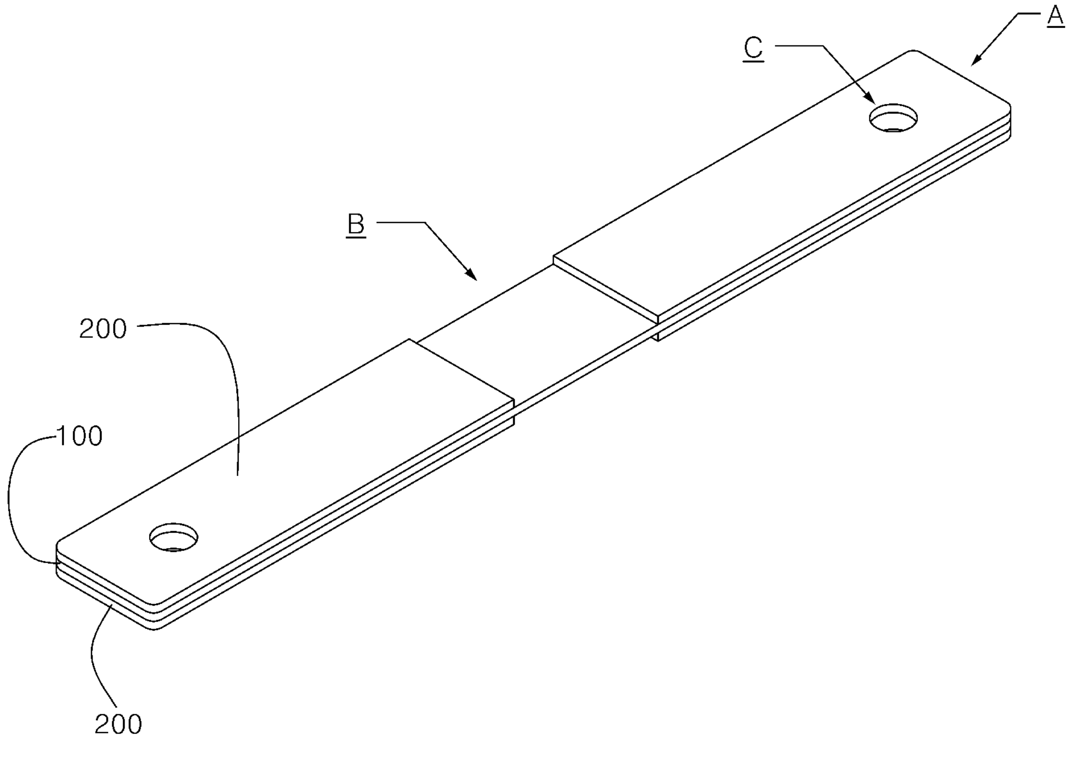
FIG. 1 is a view illustrating an example of a fusing busbar manufactured according to an embodiment of the disclosure.
Figure 2:
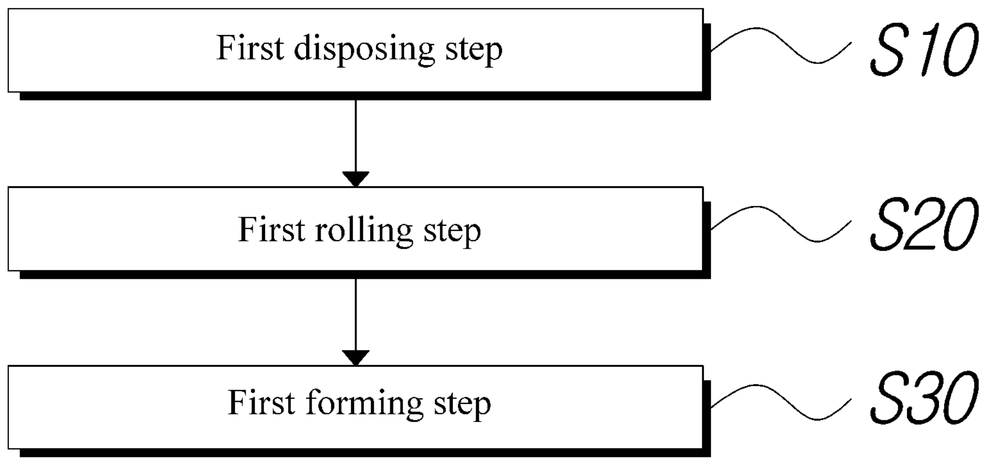
FIG. 2 is a flowchart illustrating a method for manufacturing a fusing busbar according to an embodiment.
Figure 3:
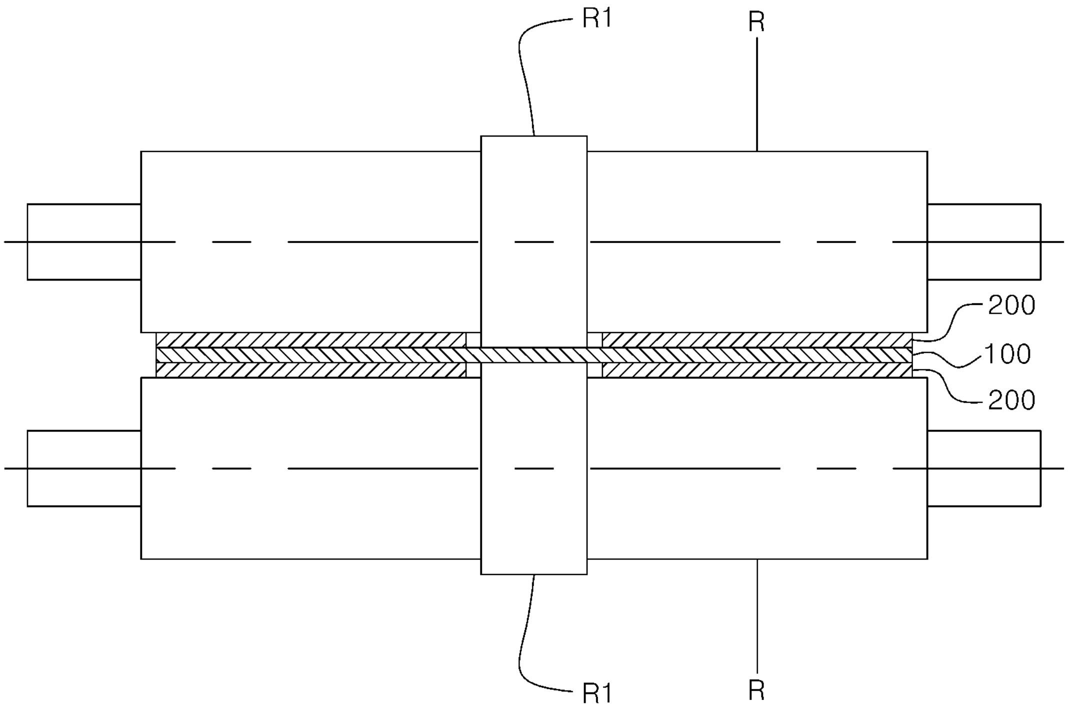
FIG. 3 is a view illustrating a first rolling step in a method for manufacturing a fusing busbar according to an embodiment.

FIG. 1 is a view illustrating an example of a fusing busbar manufactured according to an embodiment of the disclosure. FIG. 2 is a flowchart illustrating a method for manufacturing a fusing busbar according to an embodiment. FIG. 3 is a view illustrating a first rolling step in a method for manufacturing a fusing busbar according to an embodiment.

A method for manufacturing a fusing busbar is described below with reference to FIGS. 1 to 3.

According to an embodiment, a method for manufacturing a fusing busbar includes a first disposing step S10, a first rolling step S20, and a first forming step S30 to manufacture a fusing busbar by press-welding a first conductor 100 and a second conductor 200 which are different materials.

In the first disposing step S10, wound second conductors 200 are disposed on upper and lower surfaces of two opposite ends of a wound first conductor 100 which is formed of a different material from the second conductor 200.

The first conductor 100 may be an aluminum plate, and the thickness and width of the aluminum plate are not limited to specific ones.

The second conductor 200 may be a copper plate, and the thickness and width of the copper plate are not limited to specific ones but, preferably, the second conductor 200 may have the same thickness as the first conductor 100, and the width of the second conductor 200 may not exceed ½ of the width of the first conductor 100.

In the first rolling step S20, the first conductor 100 and the second conductor 200 each are unwound or unrolled and continuously fed to a rolling mill while the second conductors 200 are press-welded, by the rolling mill, onto the upper and lower surfaces of two opposite ends of the first conductor 100 into a predetermined thickness.

The rolling mill may include rolling rolls R, adjustment guides, and a guide controller.

The rolling rolls roll the joined body of heterogeneous metals in the length direction or the width direction according to the adjustment of with or length of the joined body by the adjustment guides.

The rolling rolls R are disposed up and down while being spaced apart from each other at a predetermined gap, and a spacing protrusion R1 for keeping a gap between the second conductors 200 is provided in the middle of the rolling rolls R.

The adjustment guides are installed on two opposite sides of the rolling roll R and, as controlled for movement by the guide controller, move to tightly contact the rolling roll R to thereby adjust the width or length of the joined plate.

The guide controller controls the movement of the adjustment guides to move from the two opposite sides of the rolling roll R to the center of the rolling roll R according to preset specifications of the joined plate.

According to an embodiment, the guide controller may use a hydraulic or pneumatic cylinder.

In the first forming step S30, the rolled joined plate of the first conductor 100 and the second conductor 200 is inserted into a forming machine to form a busbar shape in which the second conductors 200 are disposed at two opposite ends and the first conductor 100 is exposed in the middle of the second conductors 200.

For example, the first forming step S30 may include cutting the joined plate into a desired shape of a busbar, bending the busbar to have predetermined curvature, trimming the busbar, and punching the busbar to have through holes in busbar terminal portions. The first forming step S30 may include other steps necessary to form the busbar shape.

The forming machine may be, e.g., a press machine, but without limitations thereto, the shape of the busbar is not limited.

In the fusing busbar manufactured by the method for manufacturing a fusing busbar, as described above, the second conductors 200 are disposed at two opposite ends thereof in the length direction, and the first conductor 100 is exposed in the middle of the second conductors 200. Thus, the fusing busbar has high electrical conductivity. Further, the first conductor 100 is formed of aluminum which is lower in melting point than copper and is exposed in the middle of the busbar to function as the melting portion.

In other words, the middle of the busbar is the exposed first conductor 100 which is formed of an aluminum plate and is thinner than the two opposite ends of the busbar which are joined portions of the first conductor 100 and second conductors 200. Thus, the middle of the busbar has a smaller surface area and cross sectional area than the two opposite ends. Therefore, if overcurrent flows through the fusing busbar, the middle, i.e., the first conductor 100, of the fusing busbar, which functions as a melting portion, melts and breaks, cutting off supply of overcurrent to the electric component.

As the first conductor 100 is formed of aluminum which has excellent electrical conductivity and fusing capability and is lighter and cheaper than copper while only the two opposite ends are formed of the second conductors 200 which are formed of copper to serve as connectors, the busbar of the disclosure may reduce in cost and weight as compared with the conventional busbars formed only of copper, thus contributing to lightening of electric vehicles.

Figure 4:
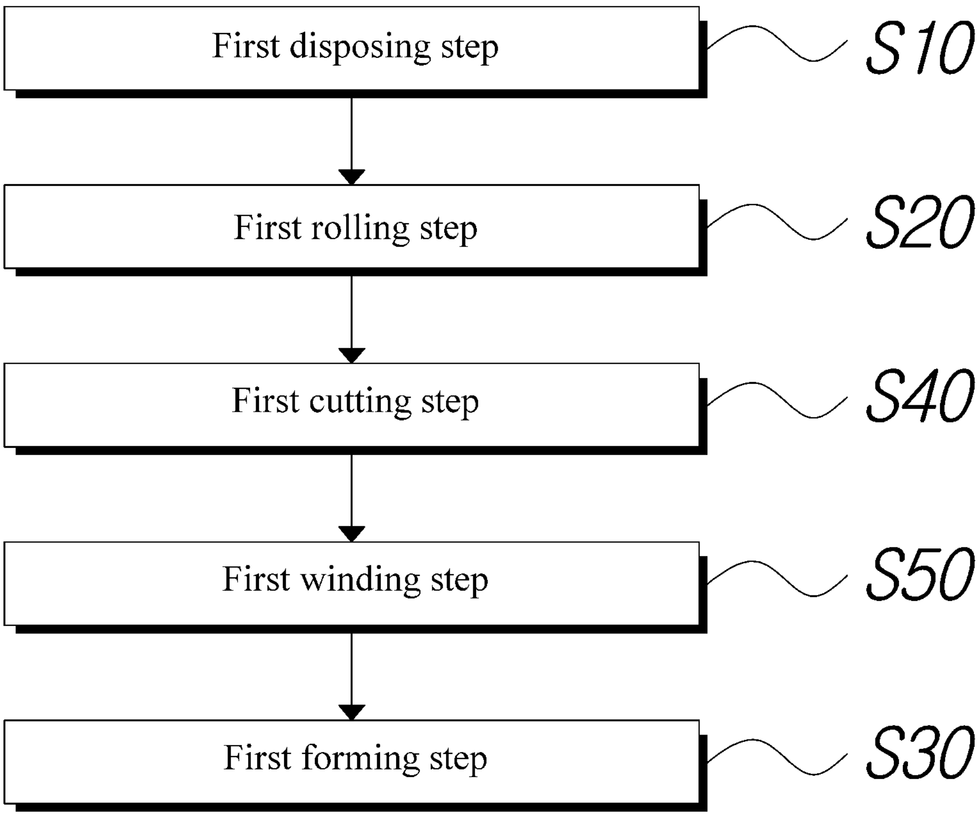
FIG. 4 is a flowchart illustrating a method for manufacturing a fusing busbar according to an embodiment.

FIG. 4 is a flowchart illustrating a method for manufacturing a fusing busbar according to an embodiment.

Figure 5:
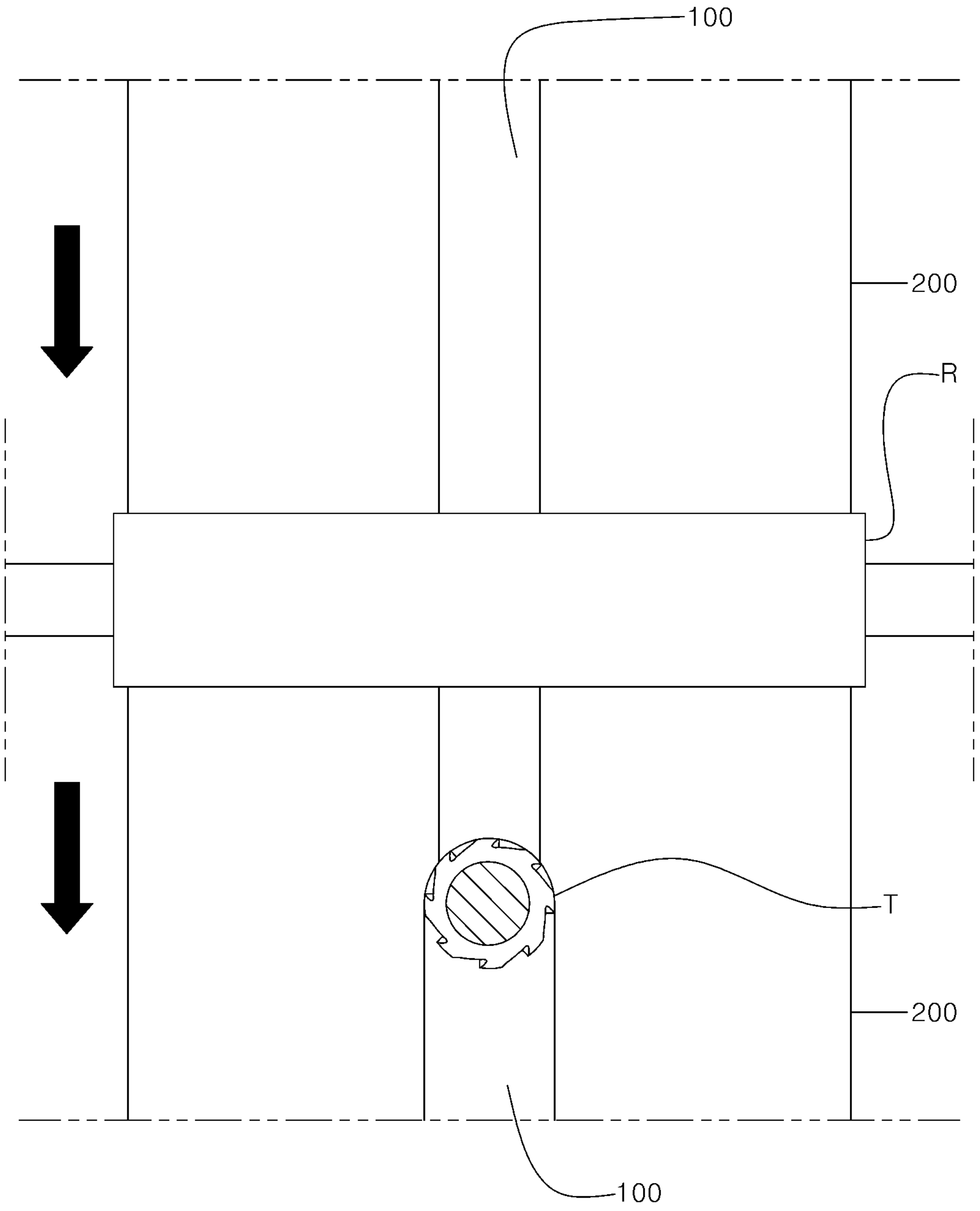
FIG. 5 is a view illustrating a first cutting step in a method for manufacturing a fusing busbar according to an embodiment.

FIG. 5 is a view illustrating a first cutting step in a method for manufacturing a fusing busbar according to an embodiment.

No repetitive description of the same or substantially the same components as those described above is given below.

According to an embodiment, the method for manufacturing a fusing busbar according to an embodiment may further include a first cutting step S40 to cut the rolled joined plate.

The first cutting step S40 cuts internal ends of the second conductors 200 into a predetermined width along the length direction of the joined plate rolled in the first rolling step S20.

In other words, a cutting tool T is placed in the middle of the second conductors 200 press-welded on the upper and lower surfaces of two opposite ends of the first conductor 100 with a predetermined gap therebetween and cuts the internal ends of the second conductors 200 along the length direction of the joined plate to thereby form a melting portion with a predetermined width and length in the middle of the joined plate.

According to an embodiment, the method for manufacturing a fusing busbar according to an embodiment may further include a first winding step S50 to wind the rolled joined plate.

The rolled joined plate is wound and is thus easy to carry, handle, and store. It is also possible to efficiently form a busbar from the joined plate by adjusting the feeding speed of the wound joined plate.

Figure 6:
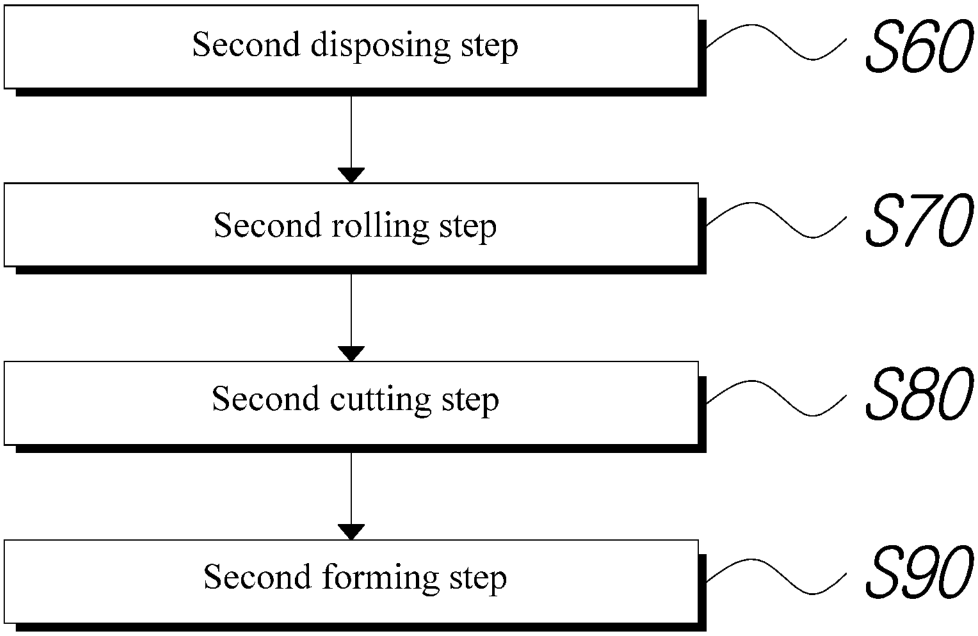
FIG. 6 is a flowchart illustrating a method for manufacturing a fusing busbar according to an embodiment.
Figure 7:
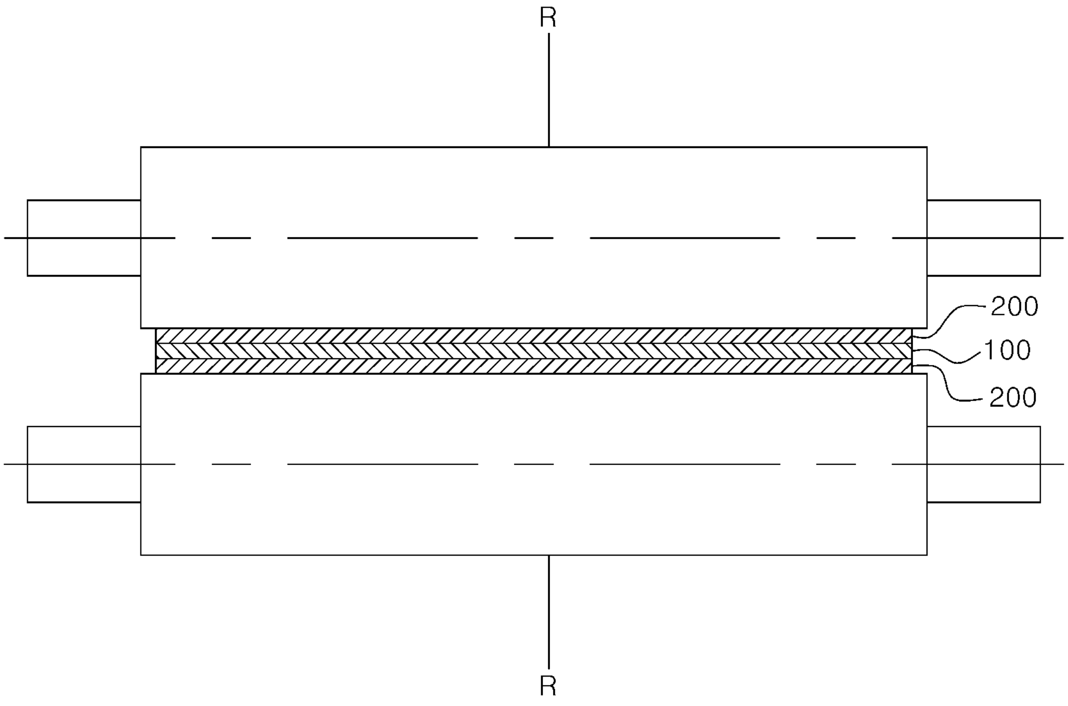
FIG. 7 is a view illustrating a second rolling step in a method for manufacturing a fusing busbar according to an embodiment.
Figure 8:
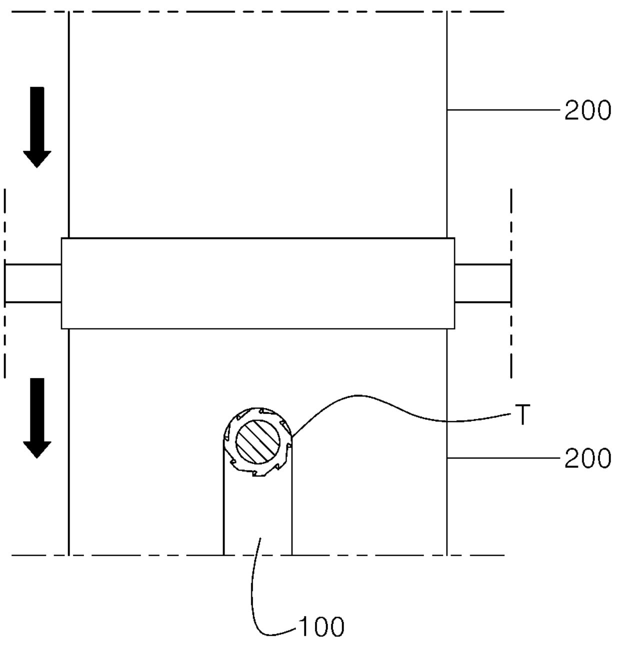
FIG. 8 is a view illustrating a second cutting step in a method for manufacturing a fusing busbar according to an embodiment.
Figure 8:
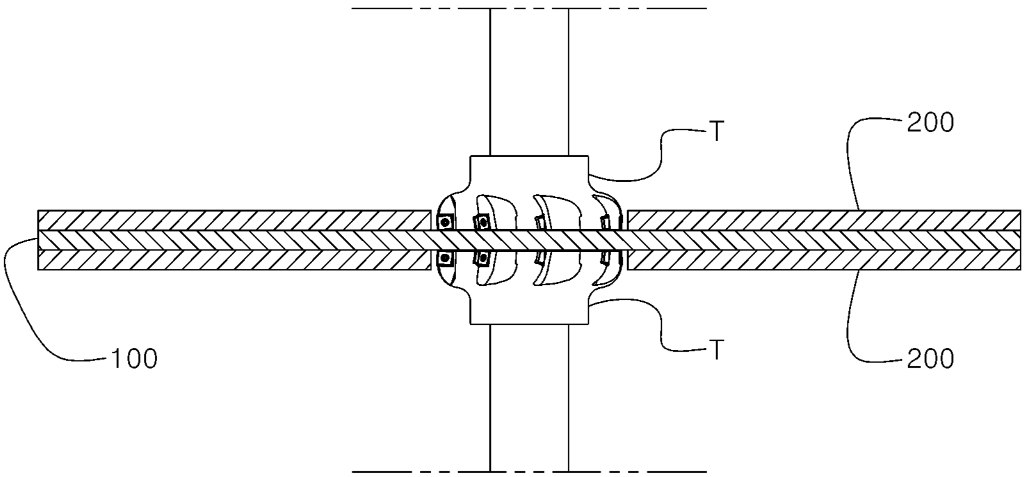

FIG. 6 is a flowchart illustrating a method for manufacturing a fusing busbar according to an embodiment. FIG. 7 is a view illustrating a second rolling step in a method for manufacturing a fusing busbar according to an embodiment. FIG. 8 is a view illustrating a second cutting step in a method for manufacturing a fusing busbar according to an embodiment.

No repetitive description of the same or substantially the same components as those described above is given below.

According to an embodiment, a method for manufacturing a fusing busbar includes a second disposing step S60, a second rolling step S70, a second cutting step S80, and a second forming step S90 to manufacture a fusing busbar by press-welding a first conductor 100 and a second conductor 200 which are different materials.

In the second disposing step S60, wound second conductors 200 are disposed on upper and lower surfaces of a wound first conductor 100 which is formed of a different material from the second conductor 200.

The first conductor 100 may be an aluminum plate, and the thickness and width of the aluminum plate are not limited to specific ones.

The second conductor 200 may be a copper plate. The thickness or width of the copper plate is not limited, but is preferably identical to the thickness or width of the first conductor 100.

In the second rolling step S70, the first conductor 100 and the second conductor 200 are unwound or unrolled and continuously fed to a rolling mill while the second conductors 200 are continuously press-welded, by the rolling mill, onto the upper and lower surfaces of the first conductor 100 into a predetermined thickness.

In the second cutting step S80, the second conductors 200 positioned above and below the first conductor 100 are cut to a predetermined width so that the first conductor 100 of the rolled joined plate is partially exposed.

In an embodiment, in the second cutting step S80, the middle of the second conductor 200 of the rolled joined plate is continuously cut in the length direction by a cutting tool T, allowing the middle of the first conductor 100 to be continuously exposed.

In an embodiment, in the second cutting step S80, the cutting tool T is placed in a direction (e.g., width direction) perpendicular to the length direction of the second conductor 200 of the rolled joined plate and cuts the second conductor 200 to a predetermined width. As cut portions are repeatedly formed with a predetermined interval, the portion where the first conductor 100 is exposed may be continuously formed with a predetermined interval.

Accordingly, in the joined plate, the portion where the first conductor 100 is exposed through the second cutting step S80 is reduced in thickness as compared with the portion where the first conductor 100 is not exposed.

The depth or width to which the second conductor 200 is cut to expose the first conductor 100 using the cutting tool T is not limited to a specific one.

In the second forming step S90, the cut joined plate is inserted into a forming machine and is then press-formed into a busbar shape in which the second conductors 200 are disposed at two opposite ends, and the first conductor 100 is exposed between the second conductors 200.

For example, the second forming step S90 may include cutting the joined plate into a desired shape of a busbar, bending the busbar to have predetermined curvature, trimming the busbar, and punching the busbar to have holes in busbar terminal portions. The second forming step S90 may include other steps necessary to form the busbar shape.

The forming machine may be, e.g., a press machine, but without limitations thereto, the shape of the busbar is not limited.

In the fusing busbar manufactured by the method for manufacturing a fusing busbar, as described above, the second conductors 200 are disposed at two opposite ends thereof in the length direction, and the first conductor 100 is exposed in the middle of the second conductors 200. Thus, the fusing busbar has high electrical conductivity. Further, the first conductor 100 is formed of aluminum which is lower in melting point than copper and is exposed in the middle of the busbar to function as the melting portion.

Figure 9:
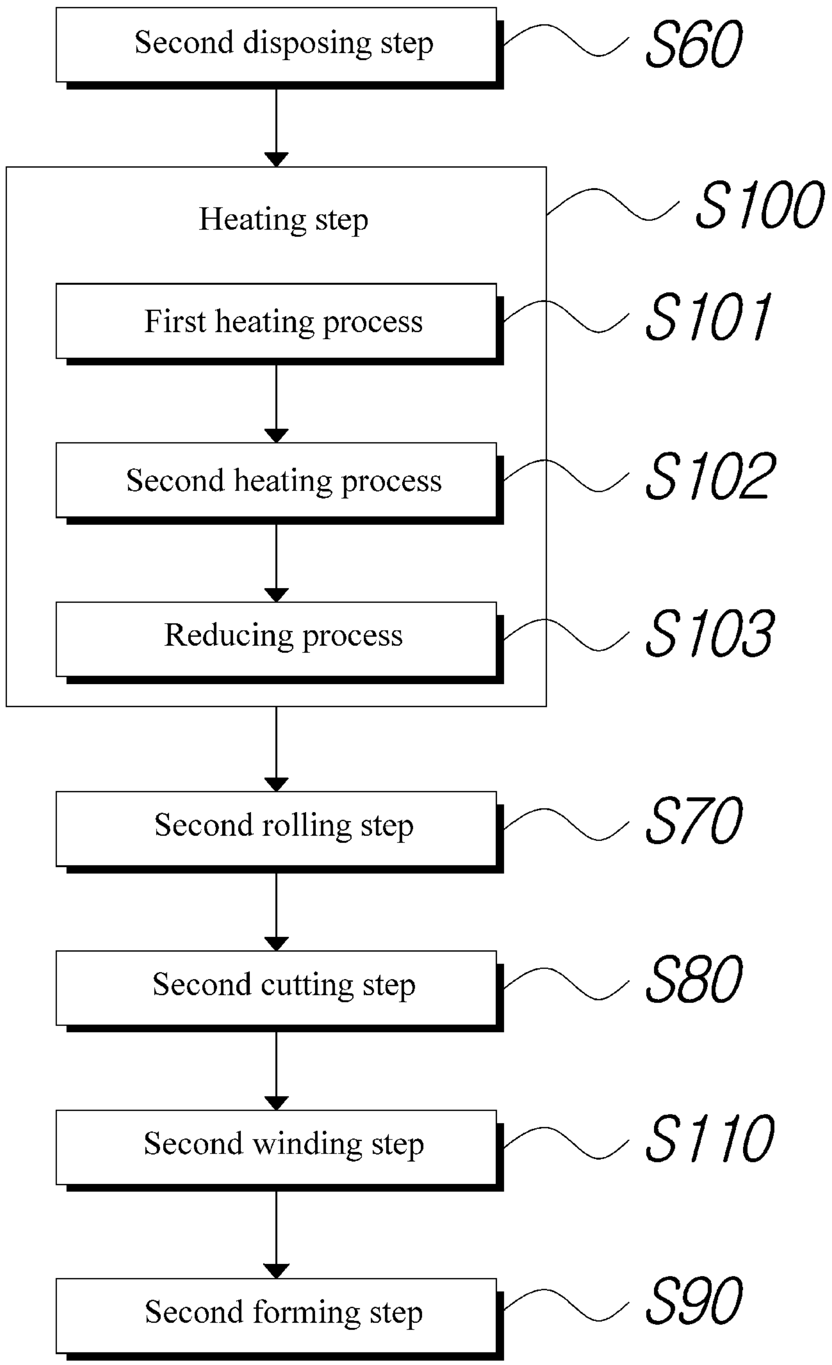
FIG. 9 is a flowchart illustrating a method for manufacturing a fusing busbar according to an embodiment.

FIG. 9 is a flowchart illustrating a method for manufacturing a fusing busbar according to an embodiment.

No repetitive description of the same or substantially the same components as those described above is given below.

According to an embodiment, the method for manufacturing a fusing busbar according to an embodiment may further include a second winding step S110 to wind the cut joined plate.

The cut joined plate is wound and is thus easy to carry, handle, and store. It is also possible to efficiently form a busbar from the joined plate by adjusting the feeding speed of the wound joined plate.

In an embodiment, the method for manufacturing a fusing busbar according to an embodiment may further include a heating step S100 for inserting the first conductor 100 and the second conductor 200 into a heating furnace to heat them at different temperatures while unwinding the first conductor 100 and the second conductor 200.

The heating step S100 may include a first heating process S101 and a second heating process S102 for heating the first conductor 100 and the second conductor 200, respectively, and a reducing process S103.

In the first heating process S101, the first conductor 100 is put into the heating furnace and heated to 350° C. to 450° C.

Therefore, the rolling rate of the first conductor 100 formed of an aluminum plate is increased through the first heating process S101, enhancing the workability in the rolling step and the joinability with the second conductor 200 when press-welding with the second conductor 200.

In the second heating process S102, the second conductor 200 is put into the heating furnace and heated to 750° C. to 850° C.

Therefore, the rolling rate of the second conductor 200 formed of a copper plate is increased through the second heating process S102, enhancing the workability in the rolling step and the joinability with the first conductor 100 when press-welding with the first conductor 100.

When two or more different metals are joined, an intermetallic compound different from the metals may be formed in the junction of the metals. The metal compound may degrade the electric conductivity in the interface, deteriorating the performance or efficiency of the fusing busbar.

Further, if the layer of the intermetallic compound is thick, the inside is prone to brittle fracture, and the joining strength between the dissimilar metals is lowered, which causes a decrease in durability and lifespan.

By being heated at different temperatures through the first heating process S101 and the second heating process S102, the first conductor 100 and the second conductor 200 may have enhanced rolling rate and joinability. Thus, the intermetallic compound which is formed when the first conductor 100 and the second conductor 200 are press-welded to each other may be reduced, preventing internal brittle fracture and degradation of electric conductivity while increasing the joining strength between the first conductor 100 and the second conductor 200.

The reducing process S103 removes the oxide layer generated on the surface of the second conductor 200 in the second heating process S102.

In an embodiment, the reducing process S103 may remove the copper oxide layer on the surface of the second conductor 200 through reaction with carbon.

Alternatively, the reducing process S103 may remove the copper oxide layer by irradiating a laser beam to the oxidized surface of the second conductor 200.

In this case, the wavelength of the laser beam is 1064 nm to 1070 nm, and the output of the laser light is 50 W to 500 W.

When a copper plate is heated, a copper oxide layer may be formed on the surface of the copper plate, causing increases in weight and electric resistance which reduces electrical conductivity.

The reducing process S103 may remove the oxide layer that may be formed on the surface of the second conductor 200 formed of a copper plate in the second heating process S102, thereby preventing degradation of electrical conductivity and an increase in weight due to the oxide copper layer.

While the disclosure has been shown and described with reference to exemplary embodiments thereof, it will be apparent to those of ordinary skill in the art that various changes in form and detail may be made thereto without departing from the spirit and scope of the disclosure as defined by the following claims.

What is claimed is:

1. A method for manufacturing a fusing busbar, the method comprising:

a disposing step of disposing wound second conductors and a wound first conductor formed of a different material from the second conductors;

a rolling step of unwinding the first conductor and the second conductors and continuously feeding the first conductor and the second conductors to a rolling mill to press-weld the second conductors onto upper and lower surfaces of the first conductor to form a rolled joined plate;

a cutting step of removing the second conductors of the rolled joined plate on the upper and lower surfaces of the first conductor to a predetermined width at a middle of the rolled joined plate to expose the first conductor; and a a forming step of press-forming the cut joined plate into a busbar shape to form the fusing busbar in which the second conductors are disposed on the upper and lower surfaces the first conductor on two opposite sides of the fusing busbar, and the first conductor is exposed in a middle of the fusing busbar.

2. The method of claim 1, wherein the first conductor is an aluminum plate, and the second conductors are copper plates.

3. The method of claim 2, further comprising a heating step of heating the first conductor and the second conductors at different temperatures, respectively, while unwinding the first conductor and the second conductors during the rolling step.

* * * * *